United States Patent
Voth et al.

(10) Patent No.: US 11,137,247 B2
(45) Date of Patent: Oct. 5, 2021

(54) METHOD AND SYSTEM FOR MEASURING THE ORIENTATION OF ONE RIGID OBJECT RELATIVE TO ANOTHER

(71) Applicant: The Boeing Company, Chicago, IL (US)

(72) Inventors: Mitchell D. Voth, Federal Way, WA (US); Timothy Kneier, Seattle, WA (US); Donald A. Spurgeon, Port Orchard, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/895,949

(22) Filed: Jun. 8, 2020

(65) Prior Publication Data
US 2020/0300624 A1    Sep. 24, 2020

Related U.S. Application Data

(63) Continuation-in-part of application No. 16/049,526, filed on Jul. 30, 2018, now abandoned.

(51) Int. Cl.
| | |
|---|---|
| *G01C 11/02* | (2006.01) |
| *G01C 11/04* | (2006.01) |
| *H04N 5/247* | (2006.01) |
| *G06T 7/70* | (2017.01) |
| *H04N 5/225* | (2006.01) |
| *B64F 5/10* | (2017.01) |

(52) U.S. Cl.
CPC ............. *G01C 11/02* (2013.01); *G01C 11/04* (2013.01); *G06T 7/70* (2017.01); *H04N 5/2253* (2013.01); *H04N 5/247* (2013.01); *B64F 5/10* (2017.01); *G06T 2207/30164* (2013.01); *G06T 2207/30244* (2013.01); *G06T 2207/30252* (2013.01)

(58) Field of Classification Search
CPC ........... G01C 11/02; G01C 11/04; G06T 7/70; G06T 2207/30164; G06T 2207/30244; G06T 2207/30252; H04N 5/2253; H04N 5/247; B64F 5/10
USPC ........................................................ 348/135
See application file for complete search history.

(56) References Cited

U.S. PATENT DOCUMENTS

| | | | | |
|---|---|---|---|---|
| 2006/0262141 | A1* | 11/2006 | Satoh | G06F 3/0346 345/633 |
| 2014/0286536 | A1* | 9/2014 | Pettersson | E02F 9/261 382/106 |

FOREIGN PATENT DOCUMENTS

| | | | | |
|---|---|---|---|---|
| WO | 2014153139 | | 9/2014 | |
| WO | WO-2014153139 A2 * | | 9/2014 | ............. G01C 11/04 |

* cited by examiner

*Primary Examiner* — Thai Q Tran
*Assistant Examiner* — Nienru Yang
(74) *Attorney, Agent, or Firm* — Gates & Cooper LLP

(57) ABSTRACT

A method and apparatus for photogrammetrically determining a six degree of freedom spatial relationship between a first object and a second object is disclosed. In one embodiment, the method comprises photogrammetrically determining a first orientation of the first object relative to the second object, photogrammetrically determining a second orientation of the second object relative to the first object, and determining the six degree of freedom spatial relationship between the first object and the second object from the photogrammetrically determined first orientation of the first object relative to the second object and the photogrammetrically determined second orientation of the second object relative to the first object.

20 Claims, 13 Drawing Sheets

Front View

METHOD AND SYSTEM FOR MEASURING THE ORIENTATION OF ONE RIGID OBJECT RELATIVE TO ANOTHER

CROSS-REFERENCE TO RELATED APPLICATIONS

This application is a continuation-in-part of U.S. patent application Ser. No. 16/049,526, entitled "METHOD AND SYSTEM FOR MEASURING THE ORIENTATION OF ONE RIGID OBJECT RELATIVE TO ANOTHER," by Mitchell D. Voth, Timothy Kneier, and Donald A. Spurgeon, filed Jul. 30, 2018, which application is hereby incorporated by reference herein.

BACKGROUND

1. Field

The present disclosure relates to systems and methods for measuring an orientation of an object, and in particular to a system and method for photogrammetrically measuring an orientation of an object relative to another object using a camera disposed on each object.

2. Description of the Related Art

Photogrammetry utilizes measurements extracted from images of optical markers ("targets") acquired from one or more sensors (e.g. cameras) to produce three-dimensional information about the relationship between the targets and the sensor(s). One such application of this technique is to measure the orientation (position and rotation) of one rigid object relative to another rigid object, where one such object might be the ground.

Standard photogrammetry methods accomplish this by use of markers on the object of interest and the use of two sensors mounted on a nearby rigid object. The position of the object of interest relative to the first sensor and the second sensor is photogrammetrically determined using measurements from each respective sensor. This creates a photogrammetry bundle comprising a system of non-linear equations that can be solved (for example, by least squares best-fit techniques) to compute the orientation of the object of interest relative to the nearby rigid object that the sensors are mounted on.

In some situations, a high level of accuracy in such measurements is desired, with rotational accuracy of particular importance. This requires the use of more cameras, cameras with lower measurement uncertainties, or both. Such solutions are costly. What is needed is a system and method for economically meeting measurement accuracy requirements, particularly with respect to rotational motion between two objects.

SUMMARY

This Summary is provided to introduce a selection of concepts in a simplified form that are further described below in the detailed description. This summary is not intended to identify key features or essential features of the claimed subject matter, nor is it intended to be used to limit the scope of the claimed subject matter.

To address the requirements described above, this document discloses a system and method for photogrammetrically determining a six degree of freedom spatial relationship between a first object and a second object. In one embodiment, the method comprises photogrammetrically determining a first orientation of the first object relative to the second object, photogrammetrically determining a second orientation of the second object relative to the first object, and determining the six degree of freedom spatial relationship between the first object and the second object from the photogrammetrically determined first orientation of the first object relative to the second object and the photogrammetrically determined second orientation of the second object relative to the first object.

Another embodiment is evidenced by a system for photogrammetrically determining a six degree of freedom spatial relationship between a first object and a second object. In this embodiment, the system comprises a first camera, mounted on the first object, for photogrammetrically determining a first orientation of the first object relative to the second object; a second camera, mounted on the second object, for photogrammetrically determining a second orientation of the second object relative to the first object using the first camera mounted on the first object; and a photogrammetry bundle adjustment module, communicatively coupled to the first camera and the second camera, for determining the six degree of freedom spatial relationship between the first object and the second object from the photogrammetrically determined first orientation of the first object relative to the second object and the photogrammetrically determined second orientation of the second object relative to the first object. In one embodiment, the photogrammetry bundle adjustment module is a processor and a communicatively coupled memory storing processor instructions for performing the foregoing photogrammetry operations.

Still another embodiment is evidenced by an apparatus for photogrammetrically determining a six degree of freedom spatial relationship between a first object and a second object, comprising: means for photogrammetrically determining a first orientation of the first object relative to the second object; means for photogrammetrically determining a second orientation of the second object relative to the first object; and means for determining the six degree of freedom spatial relationship between the first object and the second object from the photogrammetrically determined first orientation of the first object relative to the second object and the photogrammetrically determined second orientation of the second object relative to the first object.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

This disclosure presents a system and method by which the orientation of one object (Object A) relative to another object (Object B) is determined using at least one sensor mounted on each object (one on Object A to take measurements of Object B and one on Object B to take measurements of Object A). Using this system and method, one or more sensors mounted on Object A (which may be stationary or in motion) view targets mounted on Object B (which also may be stationary or in motion), and one or more sensors mounted on Object B view targets mounted on Object A. Data from all sensors on both objects are combined to generate measurements that are as much as five times more accurate than standard methods which utilize the same quantity and type of sensors, thus permitting either greater measurement accuracy, the use of lower accuracy sensors, or both.

Figure 1:
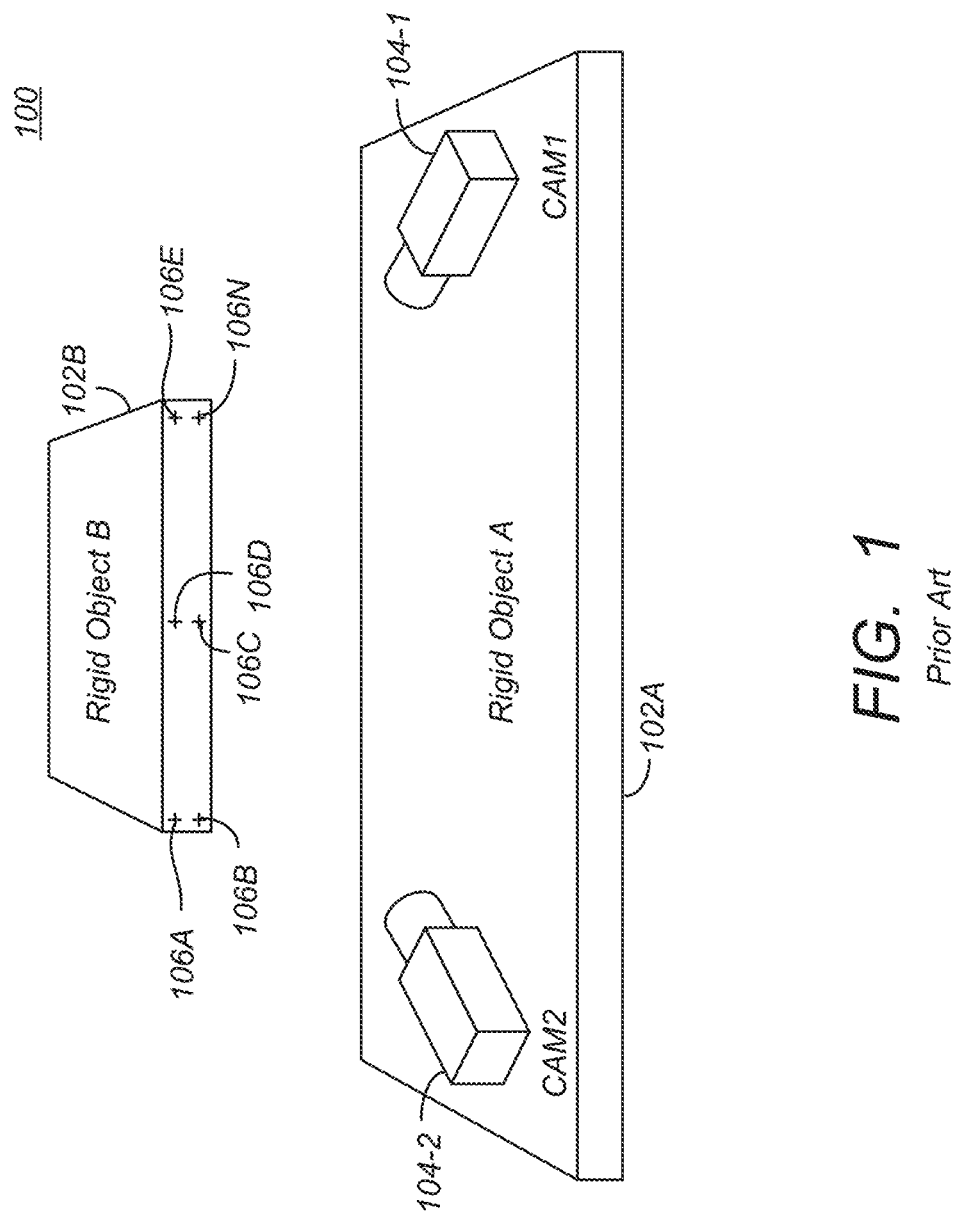
FIG. 1 is a diagram of the use of a standard photogrammetry system used to determine a six degree-of-freedom (DOF) orientation of a rigid object relative to another rigid object.

FIG. 1 is a diagram of the use of a standard photogrammetry system 100 used to determine a six degree-of-freedom (DOF) orientation of a rigid object (e.g. rigid object B) 102B relative to another rigid object (e.g. rigid object A 102A). In this standard method, one or more sensors such as first camera 104-1 (CAM 1) and second camera 104-2 (CAM2) are mounted on a fixed position on rigid object 102A (hereafter alternatively referred to as camera(s) 104.

The first camera 104-1 and second camera 104-2 are used to sense the location of a number of targets 106A-106N (alternatively collectively known hereinafter as target(s) 106) mounted at target coordinates (T) on an exterior surface of rigid object B 102B. These locations are sensed in terms of two dimensional (2D) measurements made by first camera 104-1 and second camera 104-2 (M1 and M2, respectively). These measurements, as well as the orientation of first camera 10-1 and relative to the rigid object A 102A (C1A) and of the second camera 104-2 relative to rigid object A 102A (C2A) (both of such orientation are typically measured or determined in advance) and the target 106 locations relative to rigid object B 104B (TB) are used to perform a photogrammetry computation.

Figure 2:
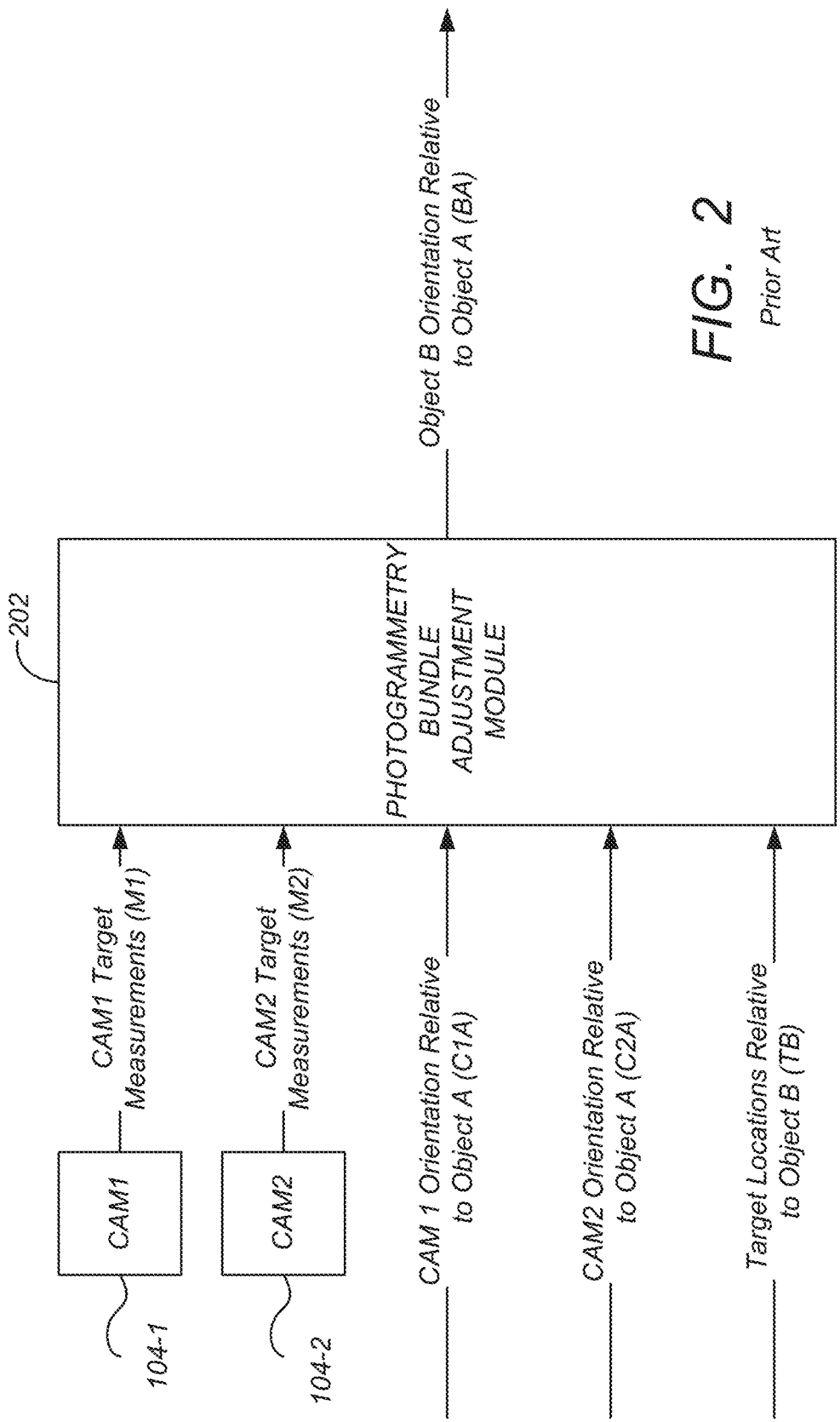
FIG. 2 is a diagram showing one embodiment of the photogrammetry computation.

FIG. 2 is a diagram showing one embodiment of the photogrammetry computation. The first camera 104-1 (CAM 1) generates two dimensional measurements of the location of the targets 106 on an exterior surface of rigid object B 102B. These two dimensional measurements or sensed location (M1) are typically obtained from images made using a planar sensor having a plurality of pixels such as a charge coupled device (CCD) or complementary metal-oxide-semiconductor (CMOS) sensor, with the location of the pixels imaging the targets 106 providing the measurement information.

Similarly, the second camera 104-2 (CAM 2) generates two dimensional measurements corresponding to sensed location (M2) of the targets 106 on the exterior surface of the rigid object B 102B. The orientation of the first camera 104-1 relative to rigid object A (C1A), the orientation of the second camera 104-2 relative to object A (C2A), and the target 106 locations relative to object B (1B) are provided to a conventional photogrammetry bundle adjustment module (PBAM) 202. The PBAM 202 accepts a set of two dimensional images depicting a number of target locations on an object from different viewpoints and simultaneously refines the coordinates defining the target locations in three dimensions according to optimality criteria. This amounts to an optimization problem on the three dimensional relationship between rigid object A and rigid object B, as well as viewing parameters (i.e., camera pose, and optionally intrinsic calibration and radial distortion), to obtain the orientation of one rigid object with respect to the other rigid object that is optimal under certain assumptions regarding the noise and image errors pertaining to the observed image features. If the image error is normally distributed about a zero mean, the bundle adjustment is an application of a maximum likelihood estimator (MLE) to a system of non-linear equations. In the application and parlance described above, the PBA solves the system of non-linear equations described below:

$$C1A*M1 \cong BA*TB \qquad \text{Equation (1)}$$

$$C2A*M2 \cong BA*TB \qquad \text{Equation (2)}$$

The result of the solution to a system of simultaneous non-linear equations of Equation (1) and Equation (2) is the orientation of object B 102B relative to object A 102A (BA).

As described above, while this technique provides a satisfactory result, if increased accuracy in the rotational aspects of the orientation are desired, this requires either the use of more cameras 104 or cameras 104 with lower measurement uncertainties, for example, cameras with higher resolution sensors or more robust signal processing. Either solution adds to the cost of obtaining the six degree-of-freedom (DOF) orientation of rigid object B 102B relative to rigid object A 102A.

The systems and methods described below use one or more cameras on two objects (where one of the objects might be the ground). The accuracy of measurements of the relative rotation between the objects is much better using this technique than if the same number of cameras were located on just one of the objects. Thus, a desired proportion of improved rotational measurement accuracy and lower cost is achieved.

FIGS. 3A-3D are diagram presenting one embodiment of illustrative operations used to determine the six degree of freedom spatial relationship between a first object such as rigid object A 102A and a second object such as rigid object B 102B.

Figure 3A:
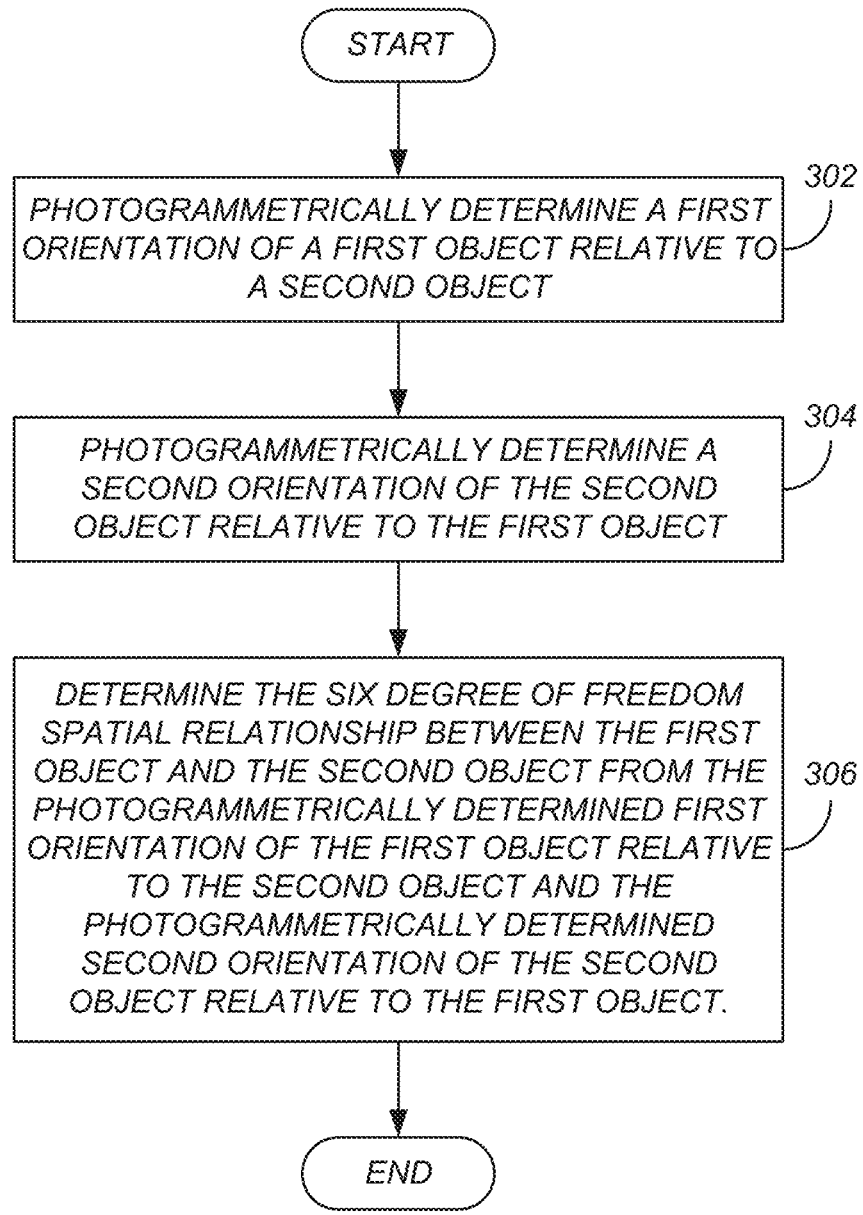
FIGS. 3A-3D are diagram presenting one embodiment of illustrative operations used to determine the six degree of freedom spatial relationship between a first object and a second object.

Beginning with FIG. 3A, in block 302, a first orientation of the first object is photogrammetrically determined relative to the second object. In block 304, a second orientation of the second object such as rigid object B 102B is determined relative to the first object. In block 306, the six degree of freedom spatial relationship between the first object and the second object is determined photogrammetrically determined orientation of the first object relative to the second object and the photogrammetrically determined orientation of the second object relative to the first object.

Figure 4A:
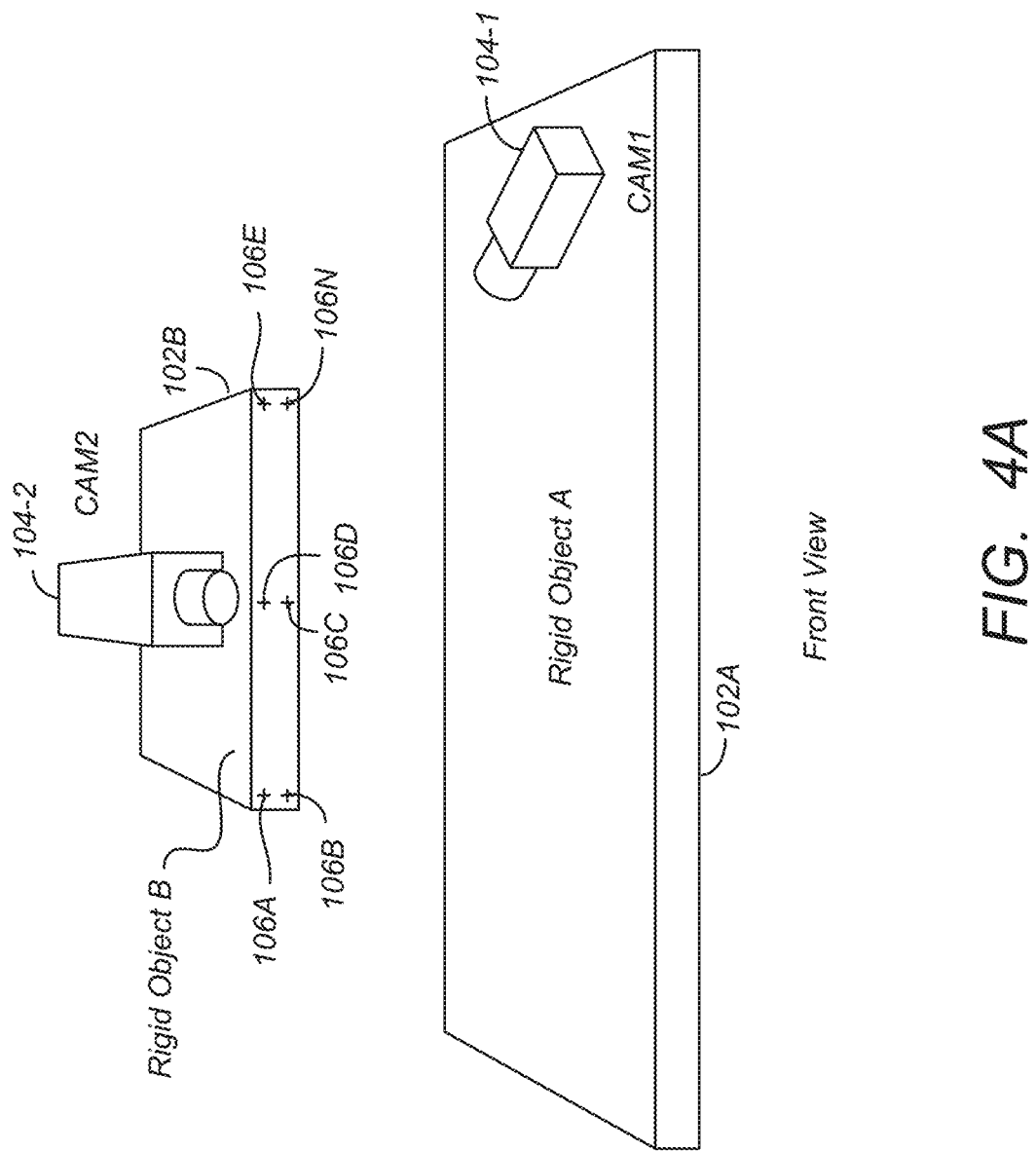
FIGS. 4A and 4B are diagrams illustrating one embodiment of an application of the improved photogrammetry method for measuring a six degree of freedom orientation of a rigid object relative to another rigid object.
Figure 4B:
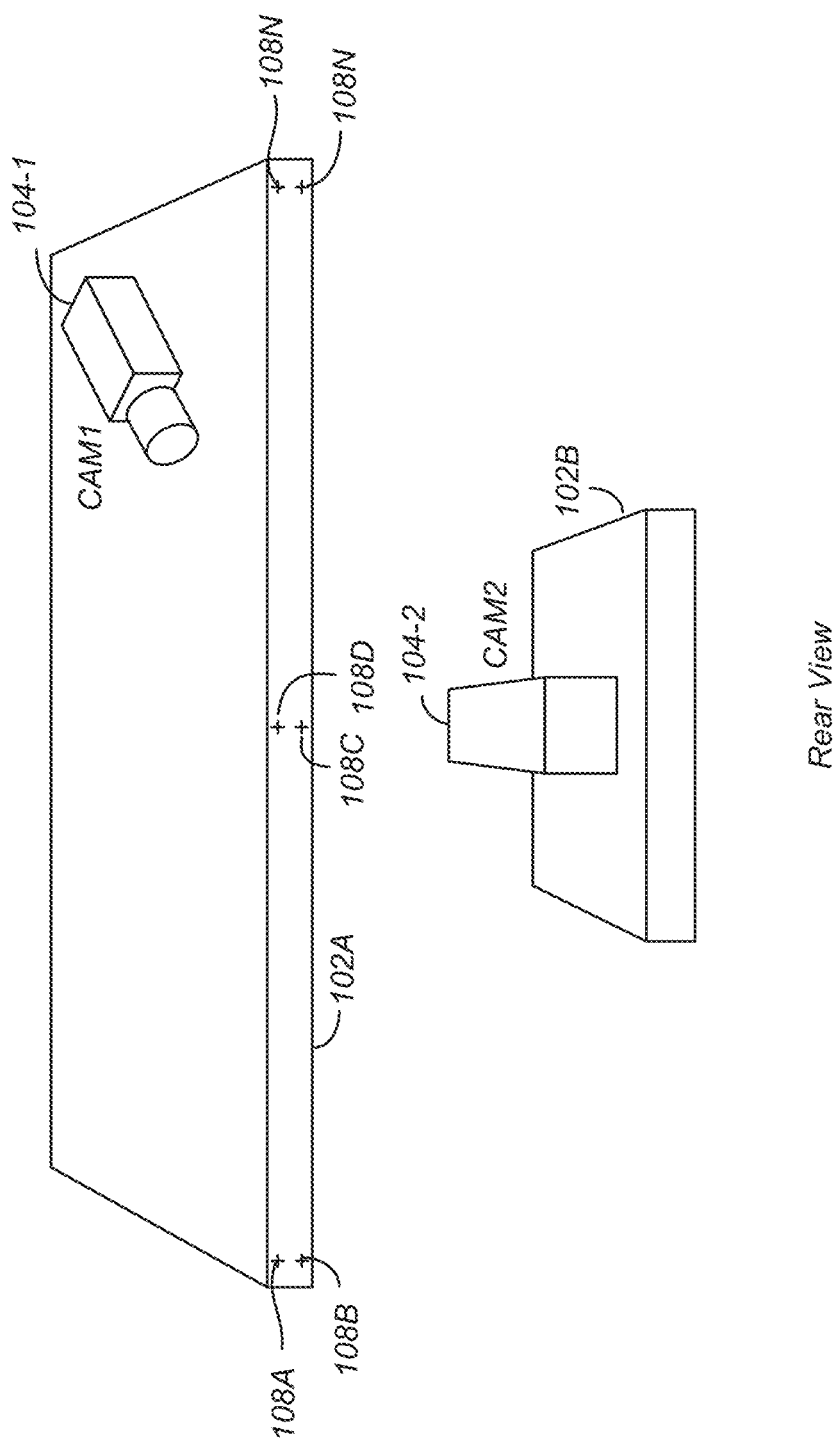

FIGS. 4A and 4B are diagrams illustrating one embodiment of an application of the improved photogrammetry method for measuring a six degree of freedom orientation of rigid object B 102B relative to rigid object A 102A (BA). FIG. 4A presents an diagram from the perspective of one standing behind the first camera 104-1 mounted on rigid object A 102A and facing the second camera 104-2 mounted on rigid object B 102B. FIG. 4B presents an diagram from the perspective of one standing behind the second camera 104-2 mounted on rigid object B 102B and facing the first camera 104-1 mounted on rigid object A 102A.

Figure 3B:
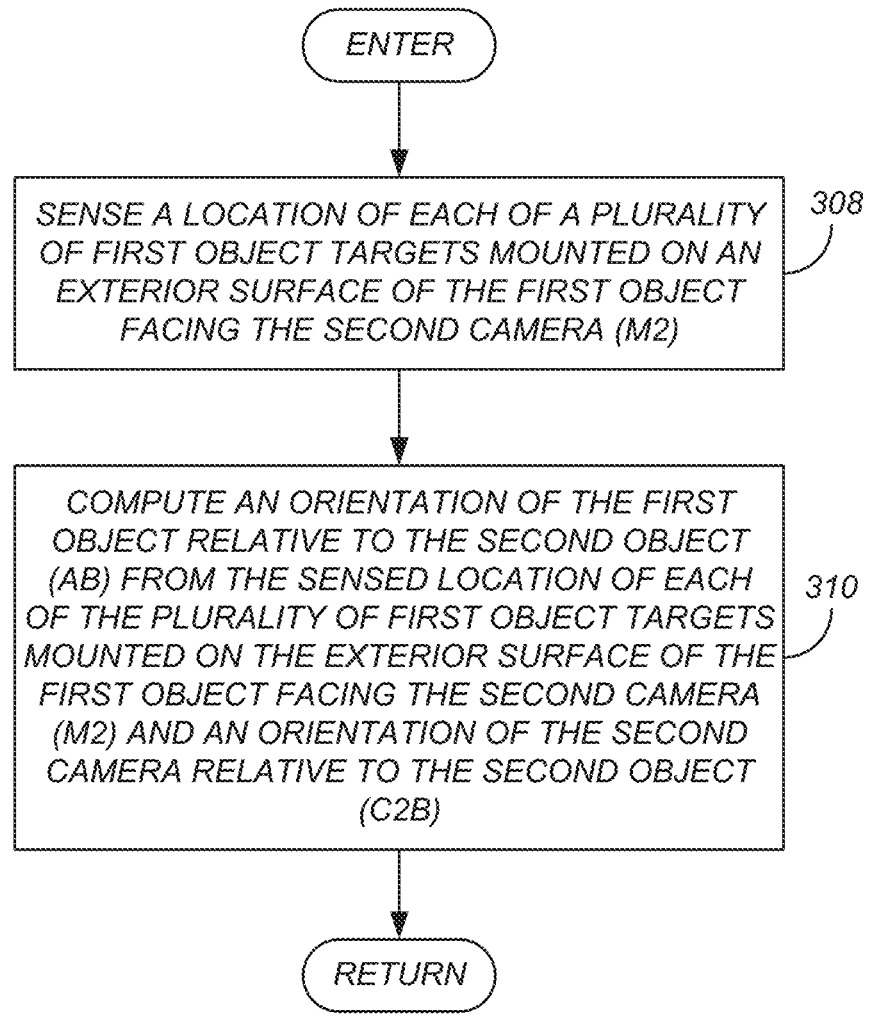

FIG. 3B is a diagram presenting one embodiment of illustrative operations used to photogrammetrically determine the first orientation of the first rigid object A 102A relative to the second rigid object B 102B. In block 308, a location of each of a plurality of first object targets 106A-106N mounted on an exterior surface of the first rigid object A 102A are sensed by the second camera 104-2 facing the plurality of first object targets 106A-106N. This data results in measurements M2. In block 310, an orientation of the first rigid object A 102A relative to the second rigid object B 102B (expressed in as AB) is computed from the sensed location (M2) of each of the plurality of first object targets 106A-106N mounted on the exterior surface of the first rigid object A 102A facing the second camera (CAM 2) and an orientation of the second camera 104-2 relative to the second object (expressed as C2B).

Figure 3C:
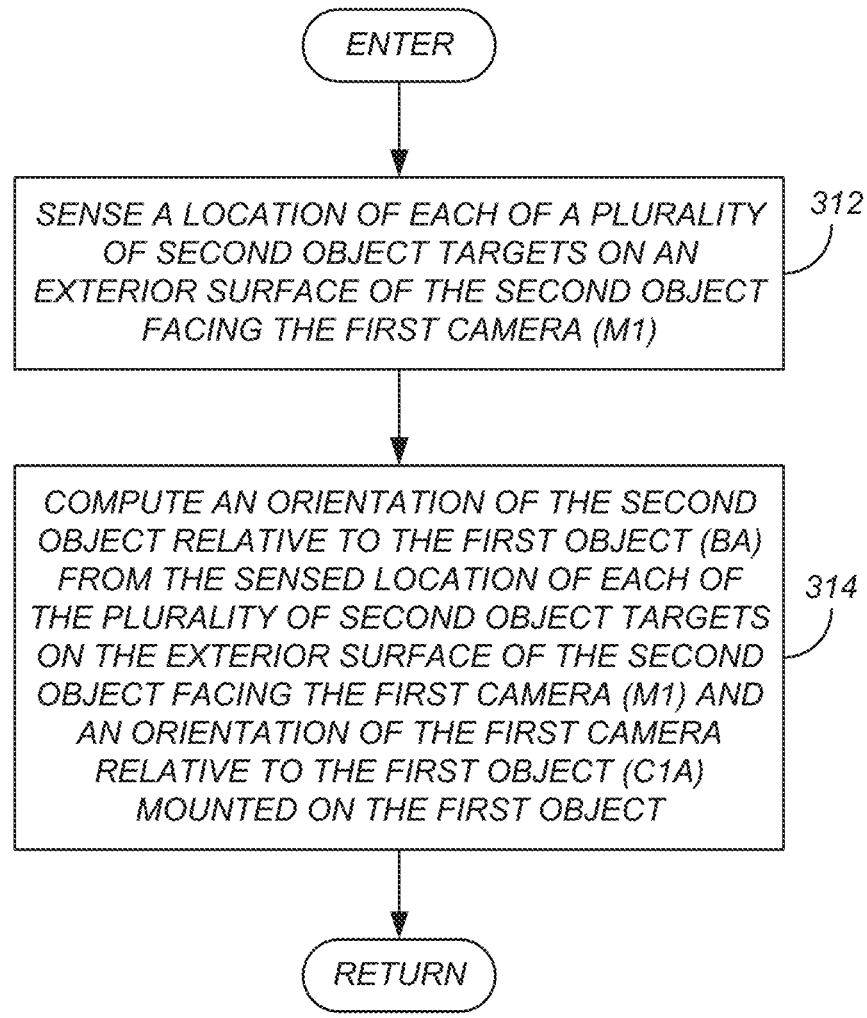
Figure 5:
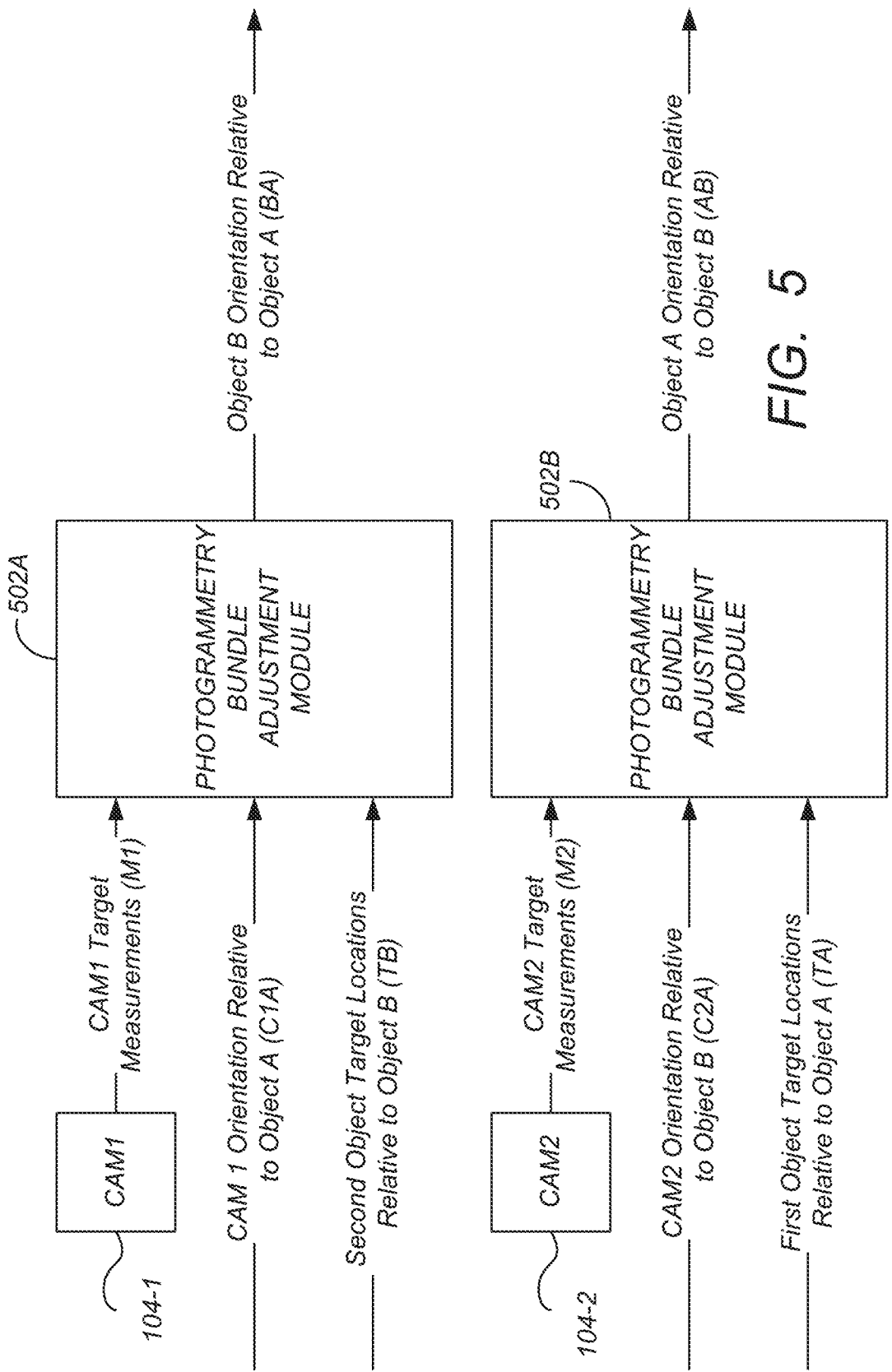
FIG. 5 is a diagram illustrating a system for accepting measurements taken with a first camera and a second camera and for generating orientation of one of the objects relative to the other using photogrammetry techniques.

Similarly, FIG. 3C is a diagram presenting one embodiment of illustrative operations used to photogrammetrically determine the second orientation of the second rigid object B 102B relative to the first rigid object A 102A (referred to as BA). In block 312, a location of each of a plurality of second object targets 108A-108N mounted on an exterior surface of the second rigid object B 102B are sensed by the first camera 104-1 facing the plurality of second object targets 108A-108N. This data results in measurements or sensed location Ml. In block 314, an orientation of the second rigid object B 102B relative to the first rigid object A 102A (expressed in as BA) is computed from the sensed location (M1) of each of the plurality of second object targets 108A-108N mounted on the exterior surface of the second rigid object B 102B facing the first camera (CAM 1) and an orientation of the second camera 104-2 relative to the second object (expressed as C2B). In one embodiment, this is accomplished as depicted in FIG. 5, which illustrates the measurements or sensed location (M1) of the first object targets 106A-106N) made with the first camera (CAM 1) 104-1 being supplied to a first PBAM 502A, along with the orientation of the first camera (CAM 1) 104-1 relative to rigid object A 102A, and the second object target locations 108A-108N relative to rigid object B 102B. The PBAM 502A computes the orientation of rigid object B 102B relative to rigid object A 102A (referred to as BA) using the least squares best-fit photogrammetry techniques described above, in particular from the relationship shown in Equation (3) below:

$$C1A*M1 \cong BA*TB \qquad \text{Equation (3)}$$

Figure 3D:
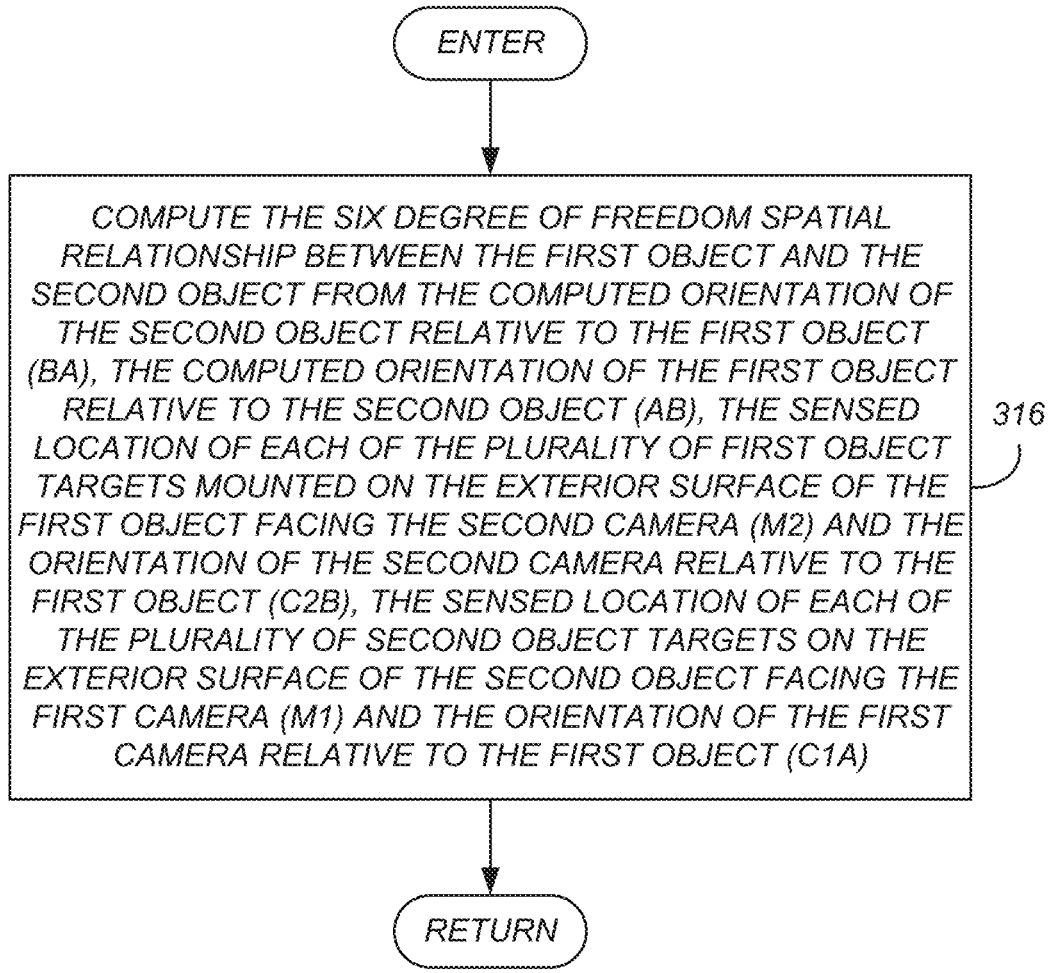

FIG. 3D is a diagram presenting one embodiment of illustrative operations used to determining the six degree of freedom spatial relationship between the first rigid object A 102A and the second rigid object B 102B from the photogrammetrically determined first orientation of the first rigid object A 102A relative to the second rigid object B 102B and the photogrammetrically determined second orientation of the second rigid object B 102B relative to the first rigid object A 102A. As illustrated in block 316, this is accomplished by computing the six degree of freedom spatial relationship between the first rigid object A 102A and the second rigid object B 102B from the computed orientation of the second rigid object B 102B relative to the first rigid object A 102A (BA), the computed orientation of the first rigid object A 102A relative to the second rigid object B 102B (AB), the sensed location (M2) of each of the plurality of first object targets mounted on the exterior surface of the first rigid object A 102A facing the second camera and the orientation of the second camera relative to the first rigid object A 102A (C2B), the sensed location (M1) of each of the plurality of second object targets on the exterior surface of the second rigid object B 102B facing the first camera and the orientation of the first camera relative to the first rigid object A 102A (C1A). In one embodiment, this is also accomplished as depicted in FIG. 5, which illustrates the measurements (M2) of the second object targets 108A-108N) made with the second camera (CAM 2) 104-2 being supplied to a second PBAM 502B, along with the orientation of the second camera (CAM 2) 104-2 relative to rigid object B 102B, and the first object target locations 106A-106N relative to rigid object A 102A. The PBAM 502B computes the orientation of rigid object A 102A relative to rigid object B 102B (referred to as AB) using the least squares best-fit photogrammetry techniques described above, in particular from the relationship shown in Equation (4) below:

$$C2B*M2 \cong AB*TA \qquad \text{Equation (4)}$$

While separate PBAMs 502A, 502B are illustrated, these operations may be performed by the same PBAM (hereinafter referred to as PBAM 502).

Figure 6:
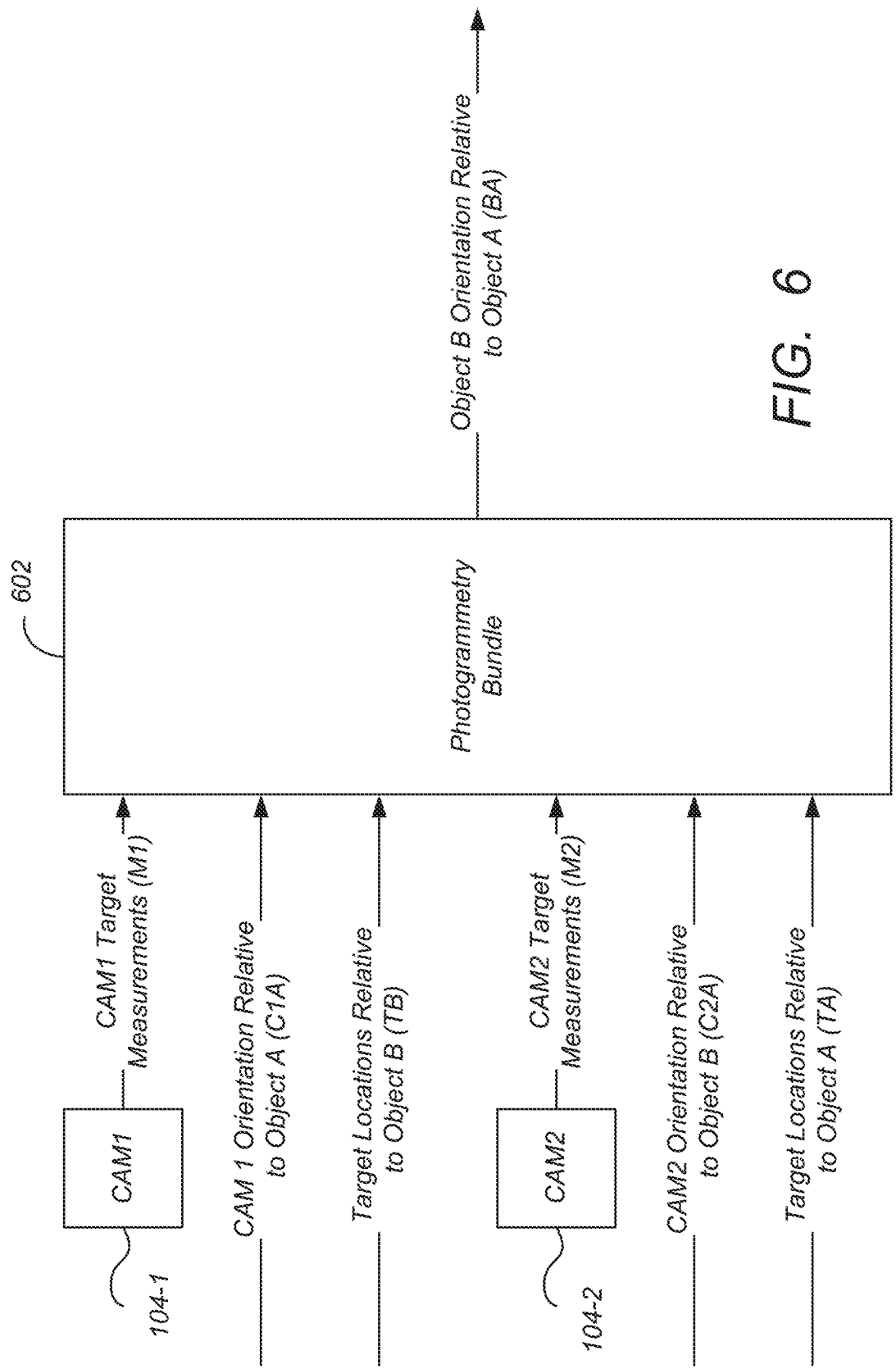
FIG. 6 is a diagram illustrating the application of the foregoing measurement techniques with an improved computational technique.

FIG. 6 is a diagram illustrating the application of the foregoing measurement techniques with an improved computational technique, thus achieving a combined result that is more accurate than previously possible with cameras of similar measurement accuracy. This computational technique utilizes Equations (3) and (4) while recognizing that AB which describes the orientation of rigid object A 102A relative to rigid object B 102B is equivalent to the inverse of BA (or BA⁻) which describes the orientation of rigid object B 102B relative to rigid object A 102A (or similarly, that BA, which describes the orientation of rigid object B 102B relative to rigid object A 102A is equivalent to the inverse of AB, or AB⁻¹, which describes the orientation of rigid object A 102A relative to rigid object B 102B). Hence, Equations (3) may be expressed as Equation (5) below:

$$AB*C1A*M1 \cong TB \qquad \text{Equation (5)}$$

thus resulting in the following system of non-linear equations:

$$C2B*M2 \cong AB*TA \qquad \text{Equation (4)}$$

$$AB*C1A*M1 \cong TB \qquad \text{Equation (5)}$$

wherein TA comprises the locations of the plurality of first object targets mounted on the exterior surface of the first object relative to the first object, and TB comprises the locations of the plurality of second object targets mounted on the exterior surface of the second object relative to the second object.

This system of non-linear equations is then solved, for example, using a least-squares best-fit to compute AB or the orientation of object rigid object A 102A relative to object B 102B.

Hence, in this embodiment, the six degree of freedom spatial relationship between the first rigid object A 102A and the second rigid object B 102B is computed from the computed orientation of the first rigid object A 102A relative to the second rigid object B 102B (AB), the inverse of a computed orientation of the first rigid object A 102A relative to the second rigid object B 102B (AB$^{-1}$), the sensed location (M2) of each of the plurality of first object targets 106A-106N mounted on the exterior surface of the first rigid object A 102A facing the second camera CAM 2 104-2 and the orientation of the second camera CAM 2 104-2 relative to the second rigid object B 102B (C2B), the sensed location (M1) of each of the plurality of second object targets 108A-108N on the exterior surface of the second rigid object B 102B facing the first camera (CAM 1) 104-1 and the orientation of the first camera (CAM 1) 104-1 relative to the first rigid object B 102B (C1A).

AB can be inverted to obtain the orientation of rigid object B 102B relative to rigid object A 102A (BA), if desired. Or, Equation 4 may be expressed as:

$$BA*C2B*M2 \cong TA \qquad \text{Equation (6)}$$

resulting in the following system of non-linear equations:

$$BA*C2B*M2 \cong TA \qquad \text{Equation (6)}$$

$$C1A*M1 \cong BA*TB \qquad \text{Equation (3)}$$

that are solved with a least-square best-fit to compute BA.

The foregoing principles can be used with additional sensors (e.g. cameras) mounted on either the same or other rigid objects. This can provide additional measurement accuracy, or permit the user to obtain equivalent measurement accuracies with lower resolution cameras. Further, these principles can be extended to situations wherein the orientation of multiple objects are determined.

Figure 7:
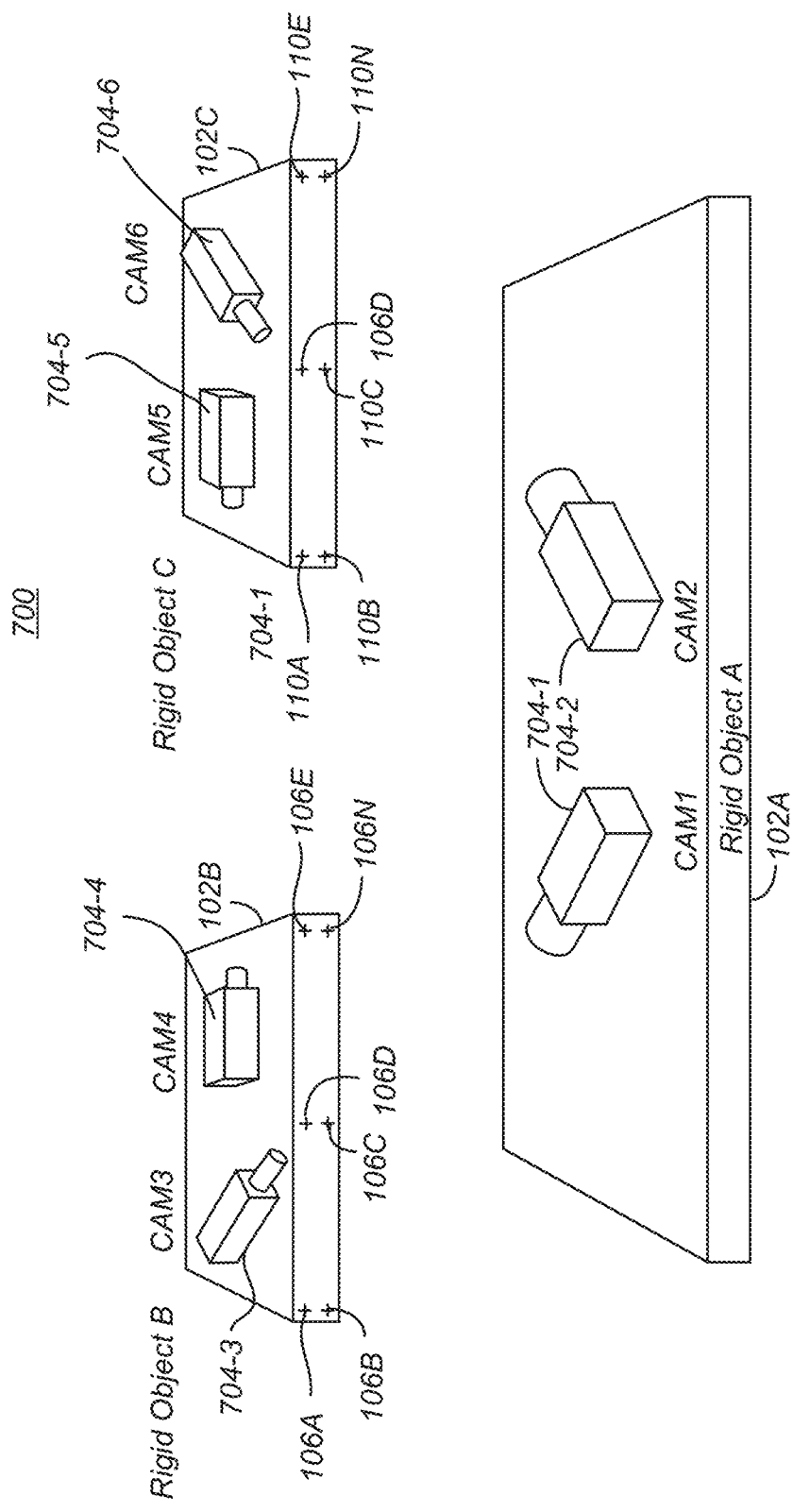
FIG. 7 illustrates a photogrammetry system used to determine a six degree-of-freedom orientation of any one or more of three rigid objects using multiple cameras.

FIG. 7 is a diagram illustrating an extension of the foregoing principles to a case of three or more rigid objects. FIG. 7 illustrates a photogrammetry system 700 used to determine a six degree-of-freedom (DOF) orientation of a rigid object (e.g. rigid object B) 102B relative to rigid objects A 102A and/or rigid object C 102C, a six degree-of-freedom orientation of rigid object C 102C relative to rigid objects A 102A and/or B 102B, and/or a six degree-of-freedom orientation of rigid object A 102A relative to rigid objects B 102B and/or C 102C. In this case, CAM 1 704-1 and CAM 2 704-2 are mounted to rigid object A 102, with CAM 1 704-1 viewing object B 102B and the targets 106A-106N mounted thereon and CAM 2 704-2 viewing object C 102C and the targets 110A-110N mounted thereon. CAM 3 704-3 and CAM 4 704-4 are mounted to object B 102B and viewing the targets mounted on object A 102A and object C 102C, respectively. Further, CAM 5 704-5 and CAM 6 704-6 are mounted on object C 102C with CAM 5 704-5 viewing the targets 106 mounted in object B 102B and CAM 6 704-6 viewing the targets 108 mounted on object A 102A. Note that although the targets are shown as not being visible to all cameras (e.g. targets 106A-106N are not visible by CAM 5 704-5, the targets 106A-106N can be placed on the object B 102B so that the targets 106A-106N are viewable by both CAM 1 704-1 and CAM 5 704-5. Further, while it is required that some of the targets 106A-106N are viewable by CAM 1 704-1 and a some by CAM 5 704-5, it is not required that those targets 106A-106N that those viewable targets 106A-106N are viewable by both CAM 1 704-1 and CAM 5 704-5.

Noting the following definitions:

C1A=orientation of CAM 1 704-1 relative to rigid object A 102A;

C2A=orientation of CAM 2 704-2 relative to rigid object A 102A;

C3A=orientation of CAM 3 704-3 relative to rigid object B 102B;

C4A=orientation of CAM 4 704-4 relative to rigid object B 102B;

C5A=orientation of CAM 5 704-5 relative to rigid object C 102C;

C6A=orientation of CAM 6 704-6 relative to rigid object C 102C;

M1B=CAM 1 704-1 measurement of targets 106A-106N on object B;

M2C=CAM 2 704-2 measurement of targets 110A-110N on object C;

M3A=CAM 3 704-2 measurement of targets 108A-108N on object A;

M4C=CAM 4 704-2 measurement of targets 110A-110N on object C;

M5B=CAM 5 704-2 measurement of targets 106A-106N on object B;

M6A=CAM 6704-2 measurement of targets on 108A-108N object A;

TA=object A target locations 108A-108N relative to object A 102A;

TB=object B target locations 106A-106N relative to object B 102B;

TA=object C target locations 100A-110N relative to object C 102C;

BA=AB$^{-1}$=object B 102B orientation relative to object A 102A;

AB=BA$^{-1}$=object A 102A orientation relative to object B 102B;

CA=AC$^{-1}$=object C 102C orientation relative to object A 102A;

AC=CA$^{-1}$=object A 102A orientation relative to object C 102C;

CB=BC$^{-1}$=object C 102C orientation relative to object B 102B; and

BC=CB$^{-1}$=object B 102B orientation relative to object C 102C.

AGVNote that in FIG. 7, what was formerly referred to as CAM 2 104-2 mounted on rigid object B 102B is now referred to as CAM 3 704-3 for notational convenience, and CAM 2 707-2 is now disposed on rigid object A 102A. With these changes in mind, it is noted that:

$$CB=(AB*CA) \qquad \text{Equation (7)}$$

$$BC=(AC*BA) \qquad \text{Equation (8)}$$

Combining all equations from all cameras results in Equations (9)-(14):

$$C1A*M1B \cong BA*TB \qquad \text{Equation (9)}$$

$$C2A*M2C \cong CA*TC \qquad \text{Equation (10)}$$

$$C3B*M3A \cong AB*TA \qquad \text{Equation (11)}$$

$$C4B*M4C \cong CB*TC \qquad \text{Equation (12)}$$

$$C5C*M5B \cong BC*TB \qquad \text{Equation (13)}$$

$$C6C*M6A \cong AC*TA \qquad \text{Equation (14)}$$

Applying matrix substitutions results in six sets of simultaneous non-linear equations that can be solved for BA and CA:

$$C1A*M1B \cong BA*TB \quad \text{Equation (9)}$$

$$C2A*M2C \cong CA*TC \quad \text{Equation (10)}$$

$$BA*C3B*M3A \cong AB \quad \text{Equation (15)}$$

$$BA*C4B*M4C \cong CA*TC \quad \text{Equation (16)}$$

$$CA*C5C*M5B \cong BA*TB \quad \text{Equation (17)}$$

$$CA*C6C*M6A \cong TA \quad \text{Equation (18)}$$

Accordingly, a six degree-of-freedom spatial relationship can be determined between the any of the rigid objects 102 with respect to any of the other rigid objects 102 using the camera measurements.

Exemplary Applications

Photogrammetric computations of the orientation of objects relative to one another or the ground are useful in a variety of applications. This includes applications where the motion of one or more of the objects is commanded and controlled by an associated one or more command signal(s) provided to motors or other motive sources to move and/or orient the objects, for example, in a closed loop control system. The observable states of such control systems include the position of the object in space, and the orientation of the object, each in orthogonal axes.

In a first exemplary application, the foregoing technique is used to assist the assembly of the fuselage and wings of a large aircraft. A plurality of automated ground vehicles (AGVs). AGVs are vehicles that can be provided a control signal to move the AGV or appendanges attached thereto in desired directions and at desired rates and accelerations. AGVs are used to support the fuselage and wings of an aircraft as they are being joined together while also being moved down an assembly line.

It is very important that the movements of the AGVs are synchronized such that no undesired loads are applied to the wings. This requires very precise lateral and rotational control of the location and orientation of the AGVs, which requires very precise knowledge of the current position and orientation of the AGVs. Photogrammetric cameras can be used to measure the precise movements of the AGVs relative to one another as they transport the wings and fuselage. Some of the photogrammetric cameras can be mounted on the AGVs themselves, each viewing targets on the other AGVs, and additional cameras may be mounted on the ground or other stationary objects. The output of the photogrammetry measurements include six degree of freedom orientations of the AGVs supporting the wings relative to the AGV(s) supporting the fuselage. This six degree of freedom orientation information can be used to make adjustments to timing and control parameters associated with each AGV to improve synchronized movement and then later confirm that the final movements before contact and assembly are within acceptable tolerances.

Figure 8:
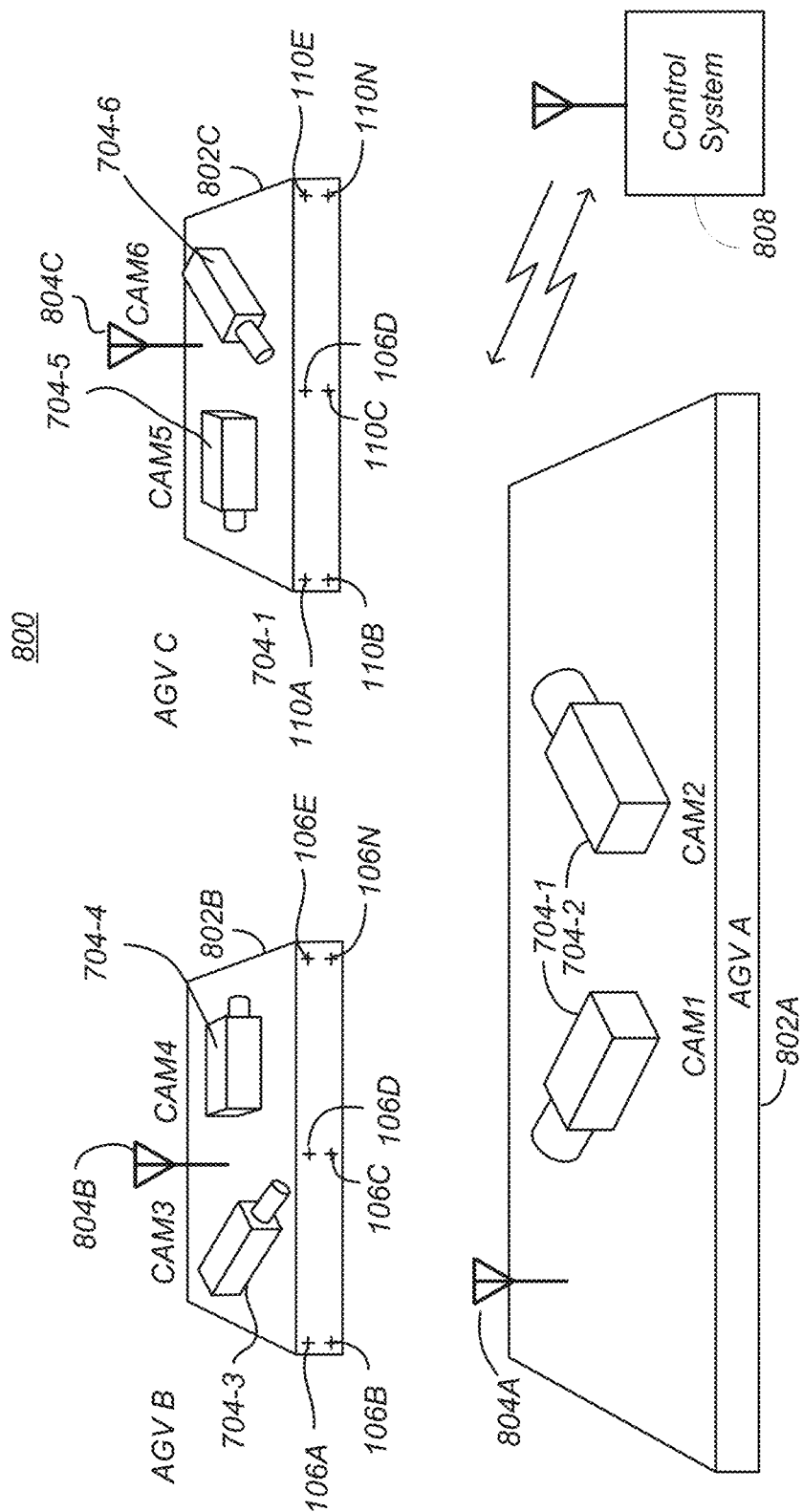
FIG. 8 is a diagram illustrating an exemplary embodiment of an application of the photogrammetry system.

FIG. 8 is a diagram illustrating a simple implementation of this application. In this case, cameras 704-1 and 704-2 are mounted on AGV A 802A, cameras 704-3 and 704-4 are mounted on AGV B 802B, and cameras 704-5 and 704-6 are mounted on AGV C 802C. Each AVG 802 has one or more motor (not shown) that is coupled to a mechanism (also not shown) that permits the AGV to move in position and/or orientation, each in three degrees of freedom, for a total of six degrees of freedom. Each AGV 802 also has an antenna 804A-804C to transmit photogrammetric data or image data to a control system 808, and the control system translates the photogrammetric data or images to commands that are sent to the AGVs 802 to operate the motors to cause the AGVs 802 to move in the commanded directions and orientations. The number of cameras required for this operation depends on the application, but in one example, 38 cameras, 8 of which were mounted to the ground, were employed.

In another exemplary application, the foregoing technique is used to measure displacement at locations of the rigid objects when the objects are under loads or otherwise subjected to input which causes such displacement. One example, is the Space Launch System (SLS) rocket will one day put the first woman on the moon. An Intertank section connects the massive LH2 and LOX fuel tanks to the Solid Rocket Boosters (SRBs), and it is the strongest component of the Core Stage. Static load qualification testing can be performed to verify the section would withstand the massive launch loads required to lift the rocket off the surface of the Earth.

A plurality of photogrammetry cameras can be used to make displacement measurements at key locations inside the Intertank section. This can be accomplished by mounting one or more of the cameras on the ground, while mounting other cameras on a moving work platform approximately 50 feet above the Intertank section. The ground cameras view targets on the lower half of the Intertank section as well as targets on the moving work platform, while the cameras disposed on the work platform viewed targets on the upper half of the Intertank section as well as targets on the ground. By combining the data from all (in one example, 24) cameras, the precise location of the moving work platform could be determined which was then used to provide precise displacements of the locations on the Intertank section. These displacements can then be used to validate finite-element-models used to predict the ability of the Intertank section to carry the loads necessary for launching the rocket from the Earth.

Hardware Environment

Figure 9:
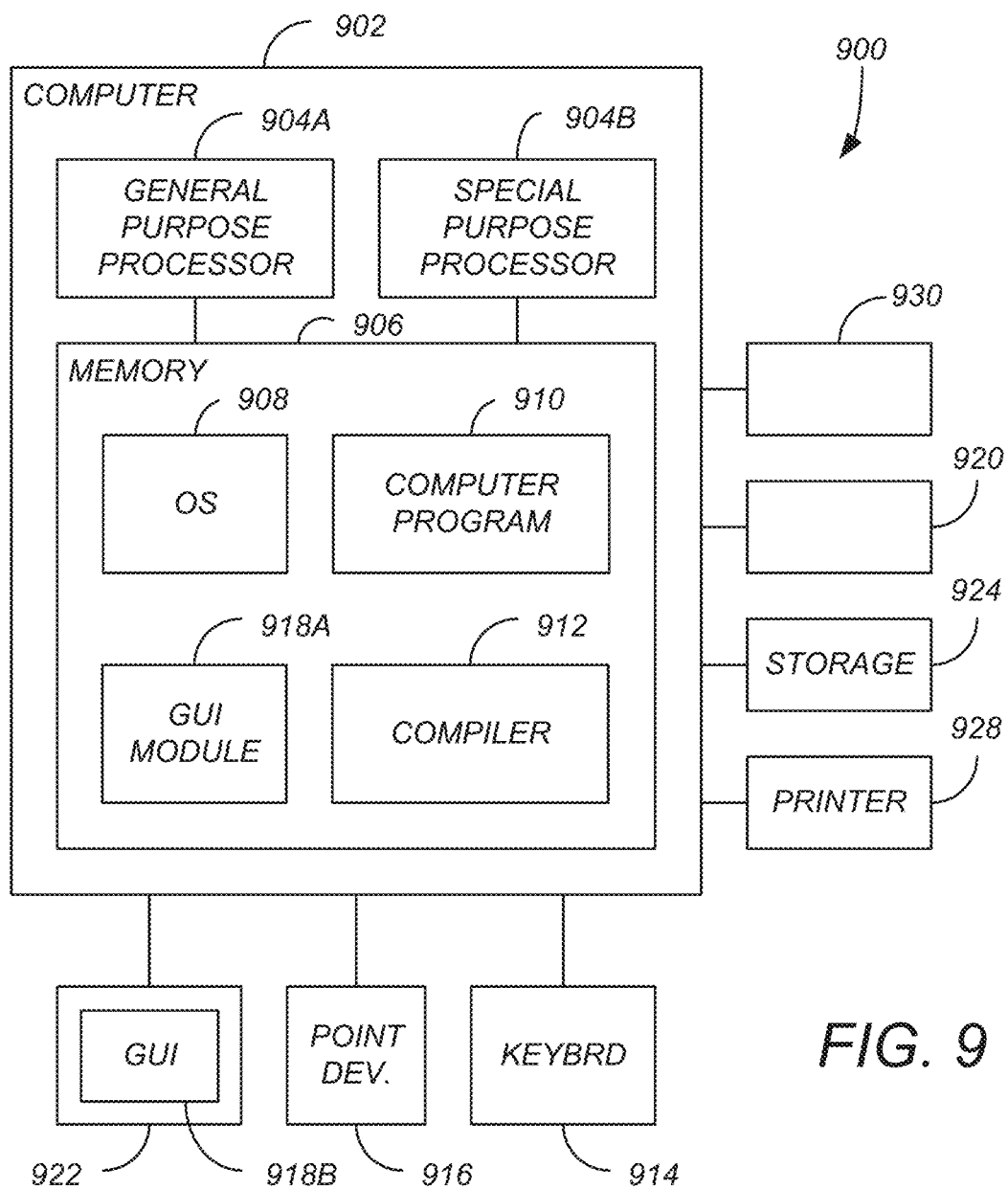
FIG. 9 illustrates an exemplary processing system for performing photogrammetric computations.

FIG. 9 illustrates an exemplary computer system 900 that could be used to implement processing elements of the above disclosure, including the photogrammetry bundle adjustment modules 502A, 502B and 602. The computer 902 comprises a processor 904 and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, a printer 928, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of photogrammetrically generating a determination of a six degree of freedom spatial relationship between a first object having a first camera mounted thereon and a second object having a second camera mounted thereon of improved accuracy, the method comprising:
photogrammetrically determining a first orientation of the first object relative to the second object using the second camera mounted on the second object to sense a location of each of a plurality of first object targets mounted on an exterior surface of the first object facing the second camera, comprising:
computing an orientation of the first object relative to the second object (AB) from the sensed location (M2) of each of the plurality of first object targets mounted on the exterior surface of the first object facing the second camera and an orientation of the second camera relative to the second object (C2B);
photogrammetrically determining a second orientation of the second object relative to the first object using the first camera mounted on the first object to sense a location of each of a plurality of second object targets mounted on an exterior surface of the second object facing the first camera, comprising:
computing an orientation of the second object relative to the first object (BA) from the sensed location (M1) of each of the plurality of second object targets on the exterior surface of the second object facing the first camera and an orientation of the first camera relative to the first object (C1A);
determining the six degree of freedom spatial relationship between the first object and the second object from the photogrammetrically determined first orientation of the first object relative to the second object and the photogrammetrically determined second orientation of the second object relative to the first object, comprising:
computing the six degree of freedom spatial relationship between the first object and the second object from the computed orientation of the second object relative to the first object (BA), the computed orientation of the first object relative to the second object (AB), the sensed location (M2) of each of the plurality of first object targets mounted on the exterior surface of the first object facing the second camera and the orientation of the second camera relative to the first object (C2B), the sensed location (M1) of each of the plurality of second object targets on the exterior surface of the second object facing the first camera and the orientation of the first camera relative to the first object (C1A), comprising:
computing the six degree of freedom spatial relationship between the first object and the second object from the computed orientation of the first object relative to the second object (AB), an inverse of a computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A);
computing an orientation of the first object or the second object from the six degree of freedom spatial relationship between the first object and the second object; and
providing a command to move at least one of the first object and the second object according to the orientation;
wherein:
the computed orientation of the first object relative to the second object (AB), the inverse of the computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A) comprise a system of equations; and the six degree of freedom spatial relationship between the first object and the second object is computed by solving a system of simultaneous equations:

$$AB * C1A * M1 \cong TB \qquad 5$$

$$C2B * M2 \cong AB * TA$$

wherein TA comprises the locations of the plurality of first object targets mounted on the exterior surface of the first object relative to the first object, and TB comprises the locations of the plurality of second object targets mounted on the exterior surface of the second object relative to the second object.

2. The method of claim 1, wherein the first object is a first vehicle and the second object is a second vehicle.

3. The method of claim 2, wherein the first vehicle movably supports a first portion of an aircraft and the second vehicle movably supports a second portion of an aircraft.

4. The method of claim 3, wherein the first vehicle are communicatively coupled to a control system that accepts the orientation of the first object or the second object and computes the command therefrom.

5. The method of claim 1, wherein at least one of the first object and the second object is a moving object.

6. The method of claim 1, wherein the method further photogrammetrically determines a six degree of freedom spatial relationship between the first object and a third object and wherein the method further comprises:
photogrammetrically determining a third orientation of the first object relative to the third object;
photogrammetrically determining a fourth orientation of the third object relative to the first object; and
determining the six degree of freedom spatial relationship between the first object and the third object from the photogrammetrically determined third orientation of the first object relative to the third object and the photogrammetrically determined fourth orientation of the third object relative to the first object.

7. The method of claim 6, wherein the method further photogrammetrically determines a six degree of freedom spatial relationship between the second object and the third object, and wherein the method further comprises:
photogrammetrically determining a fifth orientation of the second object relative to the third object;
photogrammetrically determining a sixth orientation of the third object relative to the second object; and
determining the six degree of freedom spatial relationship between the second object and the third object from the photogrammetrically determined fifth orientation of the first object relative to the third object and the photogrammetrically determined sixth orientation of the third object relative to the first object.

8. A system for photogrammetrically generating a determination of a six degree of freedom spatial relationship between a first object and a second object of improved accuracy, comprising:
a first camera, mounted on the first object, for sensing a location of each of a plurality of second object targets on an exterior surface of the second object facing the first camera and photogrammetrically determining a first orientation of the first object relative to the second object;
a second camera, mounted on the second object, for sensing a location of each of a plurality of first object targets mounted on an exterior surface of the first object facing the second camera and photogrammetrically determining a second orientation of the second object relative to the first object; and a photogrammetry bundle adjustment module, communicatively coupled to the first camera and the second camera, for determining the six degree of freedom spatial relationship between the first object and the second object from the photogrammetrically determined first orientation of the first object relative to the second object and the photogrammetrically determined second orientation of the second object relative to the first object, the photogrammetry bundle adjustment module configured to:
compute an orientation of the first object relative to the second object (AB) from the sensed location (M2) of each of the plurality of first object targets mounted on the exterior surface of the first object facing the second camera and an orientation of the second camera relative to the second object (C2B);
compute an orientation of the second object relative to the first object (BA) from the sensed location (M1) of each of the plurality of second object targets on the exterior surface of the second object facing the first camera and an orientation of the first camera relative to the first object (C1A); and
determine the six degree of freedom spatial relationship between the first object and the second object from the photogrammetrically determined first orientation of the first object relative to the second object and the photogrammetrically determined second orientation of the second object relative to the first object by computing the six degree of freedom spatial relationship between the first object and the second object from the computed orientation of the second object relative to the first object (BA), the computed orientation of the first object relative to the second object (AB), the sensed location (M2) of each of the plurality of first object targets mounted on the exterior surface of the first object facing the second camera and the orientation of the second camera relative to the first object (C2B), the sensed location (M1) of each of the plurality of second object targets on the exterior surface of the second object facing the first camera and the orientation of the first camera relative to the first object (C1A) by:
computing the six degree of freedom spatial relationship between the first object and the second object from the computed orientation of the first object relative to the second object (AB), an inverse of a computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A);
compute an orientation of the first object or the second object from the six degree of freedom spatial relationship between the first object and the second object;
providing a command to move at least one of the first object and the second object according to the orientation;

wherein:
the computed orientation of the first object relative to the second object (AB), the inverse of the computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A) comprise a system of equations; and the photogrammetry bundle adjustment module computes the six degree of freedom spatial relationship between the first object and the second object by solving a system of simultaneous equations:

$$AB*C1A*M1 \cong TB$$

$$C2B*M2 \cong AB*TA$$

wherein TA comprises the locations of the plurality of first object targets mounted on the exterior surface of the first object relative to the first object, and TB comprises the locations of the plurality of second object targets mounted on the exterior surface of the second object relative to the second object.

9. The system of claim 8, wherein the first object is a first vehicle and the second object is a second vehicle.

10. The system of claim 8, wherein the first vehicle movably supports a first portion of an aircraft and the second vehicle movably supports a second portion of an aircraft.

11. The system of claim 9, wherein the first vehicle are communicatively coupled to a control system that accepts the orientation of the first object or the second object and computes the command therefrom.

12. The system of claim 8, wherein at least one of the first object and the second object is a moving object.

13. The system of claim 8, wherein the system further photogrammetrically determines a six degree of freedom spatial relationship between the first object and a third object and wherein the system further comprises:
a third camera, mounted on the third object, for a photogrammetrically determining a third orientation of the first object relative to the third object;
a fourth camera, mounted on the first object, for photogrammetrically determining a fourth orientation of the third object relative to the first object; and
wherein the photogrammetry bundle adjustment module is further configured to determine the six degree of freedom spatial relationship between the first object and the third object from the photogrammetrically determined third orientation of the first object relative to the third object and the photogrammetrically determined fourth orientation of the third object relative to the first object.

14. The system of claim 13, wherein the system further photogrammetrically determines a six degree of freedom spatial relationship between the second object and the third object, and wherein the system further comprises:
a fifth camera, mounted on the second object, for photogrammetrically determining a fifth orientation of the second object relative to the third object; and
a sixth camera, mounted on the third object, for photogrammetrically determining a sixth orientation of the third object relative to the second object;

wherein the photogrammetry bundle adjustment module is further configured to determine the six degree of freedom spatial relationship between the second object and the third object from the photogrammetrically determined fifth orientation of the first object relative to the third object and the photogrammetrically determined sixth orientation of the third object relative to the first object.

15. An apparatus for photogrammetrically generating a determination of a six degree of freedom spatial relationship between a first object having a first camera mounted thereon and a second object having a second camera mounted thereon of improved accuracy, comprising:
means for photogrammetrically determining a first orientation of the first object relative to the second object using the second camera mounted on the second object to sense a location of each of a plurality of first object targets mounted on an exterior surface of the first object facing the second camera, comprising:
means for computing an orientation of the first object relative to the second object (AB) from the sensed location (M2) of each of the plurality of first object targets mounted on the exterior surface of the first object facing the second camera and an orientation of the second camera relative to the second object (C2B);
means for photogrammetrically determining a second orientation of the second object relative to the first object using the first camera mounted on the first object to sense a location of each of a plurality of second object targets mounted on an exterior surface of the second object facing the first camera, comprising:
means for computing an orientation of the second object relative to the first object (BA) from the sensed location (M1) of each of the plurality of second object targets on the exterior surface of the second object facing the first camera and an orientation of the first camera relative to the first object (C1A);
means for determining the six degree of freedom spatial relationship between the first object and the second object from the photogrammetrically determined first orientation of the first object relative to the second object and the photogrammetrically determined second orientation of the second object relative to the first object, comprising:
means for computing the six degree of freedom spatial relationship between the first object and the second object from the computed orientation of the second object relative to the first object (BA), the computed orientation of the first object relative to the second object (AB), the sensed location (M2) of each of the plurality of first object targets mounted on the exterior surface of the first object facing the second camera and the orientation of the second camera relative to the first object (C2B), the sensed location (M1) of each of the plurality of second object targets on the exterior surface of the second object facing the first camera and the orientation of the first camera relative to the first object (C1A), comprising:
means for computing the six degree of freedom spatial relationship between the first object and the second object from the computed orientation of the first object relative to the second object (AB), an inverse of a computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A);

means for computing an orientation of the first object or the second object from the six degree of freedom spatial relationship between the first object and the second object;

means for providing a command to move at least one of the first object and the second object according to the orientation;

wherein:

the computed orientation of the first object relative to the second object (AB), the inverse of the computed orientation of the first object relative to the second object (AB-1), the sensed location (M2) of each of the plurality of first object targets mounted on the exterior surface of the first object facing the second camera and the orientation of the second camera relative to the second object (C2B), the sensed location (M1) of each of the plurality of second object targets on the exterior surface of the second object facing the first camera and the orientation of the first camera relative to the first object (C1A) comprise a system of equations; and the six degree of freedom spatial relationship between the first object and the second object is computed by solving a system of simultaneous equations:

$$AB * C1A * M1 \cong TB$$

$$C2B * M2 \cong AB * TA$$

wherein TA comprises the locations of the plurality of first object targets mounted on the exterior surface of the first object relative to the first object, and TB comprises the locations of the plurality of second object targets mounted on the exterior surface of the second object relative to the second object.

16. The apparatus of claim 15, wherein the first object is a first vehicle and the second object is a second vehicle.

17. The apparatus of claim 16, wherein the first vehicle movably supports a first portion of an aircraft and the second vehicle movably supports a second portion of an aircraft.

18. The apparatus of claim 17, wherein the first vehicle are communicatively coupled to a control system that accepts the orientation of the first object or the second object and computes the command therefrom.

19. The apparatus of claim 16, wherein at least one of the first object and the second object is a moving object.

20. The apparatus of claim 16, further comprising means for photogrammetrically determines a six degree of freedom spatial relationship between the first object and a third object;

means for photogrammetrically determining a third orientation of the first object relative to the third object;

means for photogrammetrically determining a fourth orientation of the third object relative to the first object; and means for determining the six degree of freedom spatial relationship between the first object and the third object from the photogrammetrically determined third orientation of the first object relative to the third object and the photogrammetrically determined fourth orientation of the third object relative to the first object.

* * * * *